United States Patent
Koike et al.

(10) Patent No.: US 7,729,858 B2
(45) Date of Patent: *Jun. 1, 2010

(54) TRAVEL SAFETY APPARATUS FOR VEHICLE

(75) Inventors: Hiroyuki Koike, Utsunomiya (JP);
Yoichi Sugimoto, Utsunomiya (JP);
Yoshihiro Urai, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 881 days.

This patent is subject to a terminal disclaimer.

(21) Appl. No.: 11/511,530

(22) Filed: Aug. 29, 2006

(65) Prior Publication Data
US 2007/0050114 A1 Mar. 1, 2007

(30) Foreign Application Priority Data
Aug. 31, 2005 (JP) ............................. 2005-250885
Jun. 19, 2006 (JP) ............................. 2006-169105

(51) Int. Cl.
*G08G 1/16* (2006.01)
*B60R 21/00* (2006.01)

(52) U.S. Cl. ........................... 701/301; 701/70; 340/436
(58) Field of Classification Search ........................ None
See application file for complete search history.

(56) References Cited

U.S. PATENT DOCUMENTS 5,585,798 A * 12/1996 Yoshioka et al. .............. 342/70
6,061,015 A * 5/2000 Sugimoto ..................... 342/71
6,492,935 B1 * 12/2002 Higuchi ....................... 342/70
7,042,389 B2 * 5/2006 Shirai .......................... 342/70
7,453,374 B2 * 11/2008 Koike et al. ................. 340/903
2004/0189512 A1 * 9/2004 Takashima et al. ............ 342/70
2005/0012602 A1 * 1/2005 Knoop et al. ................ 340/435

FOREIGN PATENT DOCUMENTS

JP 2002-099907 A 4/2002

* cited by examiner

*Primary Examiner*—Michael J. Zanelli
(74) *Attorney, Agent, or Firm*—Arent Fox LLP

(57) ABSTRACT

A travel safety apparatus for a vehicle, the apparatus includes: a first detector detecting an object in a first detection area; a second detector detecting the object in a second detection area; a braking device decelerating the vehicle; an alarm device which outputs an alarm to an occupant of the vehicle; a third detector measuring the traveling state of the vehicle; a collision determination device which determines a possibility of a collision between the vehicle and the object based on the traveling state; and a controller which operates at least one of the braking device and the alarm device when there is the possibility of collision, wherein the controller changes at least one of operation timing of the alarm device, operation timing of the braking device, and deceleration degree made by the braking device in accordance with whether or not the first detector and the second detector detect the object.

8 Claims, 4 Drawing Sheets

TRAVEL SAFETY APPARATUS FOR VEHICLE

BACKGROUND OF THE INVENTION

1. Field of the Invention

The present invention relates to a travel safety apparatus for a vehicle.

Priority is claimed on Japanese Patent Application No. 2005-250885, filed Aug. 31, 2005 and Japanese Patent Application No. 2006-169105, filed Jun. 19, 2006, the contents of which are incorporated herein by reference.

2. Description of Related Art

An apparatus is known for detecting an object around a vehicle for preventing a collision between the object and the vehicle or for reducing damage due to the collision, the apparatus having a plurality of detectors such as a radar and an imaging device and recognizing the object based on detection results of the detectors (see, for example, Japanese Unexamined Patent Application, First Publication No. 2002-99907).

In the apparatus of the aforementioned related art, a predetermined approximately sectorial detection assurance range in which a predetermined detecting accuracy is secured is set to each detector. The aforementioned apparatus performs a predetermined recognition processing in accordance with detection conditions such as whether or not the object is in an area which at least two detection assurance ranges cover and whether or not the object is in an area which only one of the assurance ranges covers. In addition, enlargement of each assurance range is sometimes required to determine a possibility of a collision swiftly and to perform proper operations for preventing a collision or reducing damage due to a collision, with respect not only to the object ahead of the vehicle but also an object approaching the vehicle from the side.

However, the center angle of the detection assurance range of the radar is not easy to enlarge, while that of the imaging device can be enlarged, for example by applying a wide-angle lens. This is a cause of complexity in the apparatus constitution and rising cost. In addition, since the imaging device has shorter a assured detecting distance than the radar, the detection reliability of the imaging device tends to decline in accordance with changes of conditions such as weather.

SUMMARY OF THE INVENTION

The present invention was made in view of the above circumstances, and an object thereof is to provide a travel safety apparatus for a vehicle which can perform operations for preventing a collision between the vehicle and an object around the vehicle or reducing the damage due to the collision at a proper timing and condition without enlarging the detection assurance range of a plurality of detectors.

A first aspect of the present invention is a travel safety apparatus for a vehicle, the travel safety apparatus including: a first detector provided in the vehicle for detecting an object in a first detection area defined by a first detection angle; a second detector provided in the vehicle for detecting the object in a second detection area defined by a second detection angle which is smaller than the first detection angle; a braking device provided in the vehicle for decelerating the vehicle; an alarm device which outputs an alarm to an occupant of the vehicle; a third detector provided in the vehicle for measuring the traveling state of the vehicle; a collision determination device which determines a possibility of a collision between the vehicle and the object detected by at least one of the first detector and the second detector based on the traveling state measured by the third detector; and a controller which operates at least one of the braking device and the alarm device when the collision determination device determines that there is the possibility of collision, wherein the controller changes at least one of operation timing of the alarm device, operation timing of the braking device, and deceleration degree made by the braking device in accordance with whether or not the first detector and the second detector detect the object.

Accordingly, the travel safety apparatus of the present invention can prevent a collision or reduce damage due to a collision at a proper timing and condition in accordance with the object detection conditions of the first detector and the second detector, that is, reliabilities in each detection result.

The traveling state may include at least one of a velocity of the vehicle, a yaw rate of the vehicle, and a steering angle of the vehicle.

The controller may operate at least one of the braking device and the alarm device at a predetermined first timing when the first detector detects the object, and the controller may operate at least one of the braking device and the alarm device at a predetermined second timing which is later than the first timing when only the second detector detects the object.

In this case, when only the second detector detects the object, the travel safety apparatus determines the reliability of the collision determination result is lower than when only the first detector such as cameras detect the object or when both of the radar and the cameras detect the object, and delays the operation timing of alarming and/or deceleration. The alarming and deceleration at improper timing thus can be avoided.

The first detector may be a camera, and the controller may set the deceleration degree as a second deceleration degree when the camera has detected the object for a predetermined period of time, and set the deceleration degree as a first deceleration degree which is smaller than the second deceleration degree when the camera has not detected the object for a predetermined period of time.

In this case, if the object is continuously detected only by the cameras for a predetermined period of time, the safety apparatus determines that the reliability of the collision determination result is higher than before the object is continuously detected. The safety apparatus can perform proper operations for preventing a collision or reducing damage due to a collision by decelerating at the greater second deceleration degree.

The controller may set the deceleration degree as a second deceleration degree in a first condition in which both the first detector and the second detector detect the object, and set the deceleration degree as a first deceleration degree which is smaller than the second deceleration degree in a second condition in which only the first detector detects the object, and the controller may set the deceleration degree as the second deceleration degree when the second condition changes into the first condition, and maintains the second deceleration degree when the first condition changes into the second condition.

In this case, the travel safety apparatus determines that the reliability of the collision determination result of the collision determination device is higher in the first condition than in the second condition. The travel safety apparatus can perform proper operations for preventing a collision or reducing damage due to a collision by setting the second deceleration degree to the braking device. In addition, the deceleration degree is maintained as the second deceleration degree when the first condition changes into the second condition. The occupant's sense of discomfort about the traveling of the vehicle thus can be avoided.

DETAILED DESCRIPTION OF THE INVENTION

A travel safety apparatus of an embodiment of the present invention shall be described with reference to the accompanying drawings.

Figure 1:
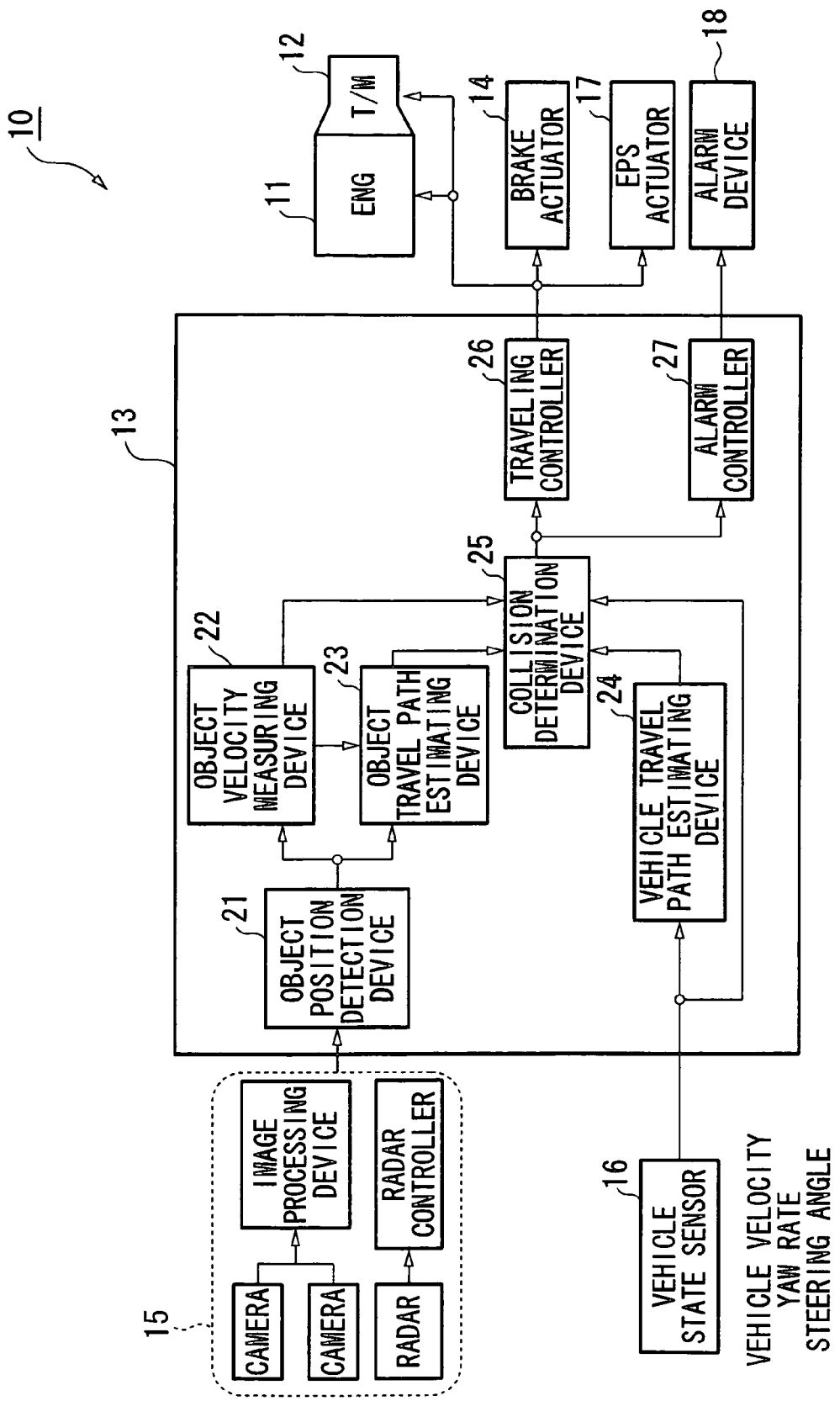
FIG. 1 is a functional block diagram showing the constitution of a travel safety apparatus for a vehicle according to an embodiment of the present invention.

As shown in FIG. 1, a travel safety apparatus 10 of the present embodiment is mounted in a vehicle that transmits drive power from an internal-combustion engine 11 to the drive wheels of the vehicle by means of a transmission (T/M) 12 such as an automatic transmission (AT) or a continuously variable transmission (CVT), and has a constitution provided with a processing unit 13, a brake actuator 14, an external sensor 15, a vehicle state sensor 16, an EPS actuator 17, and an alarm device 18.

The external sensor 15 has a constitution provided with a pair of cameras (hereinafter, simply referred to as "cameras") including a CCD camera or CMOS camera capable of performing imaging in the visible-light region and infrared region, an image processing device, a beam-scan type millimeter-wave radar, and a radar controller.

The image processing device performs specific image processing such as filtering and binarization of external images ahead of the vehicle obtained by imaging of the cameras, generates a pair of image data consisting of two-dimensionally arranged pixels, and outputs the image data to the processing unit 13.

In addition, the radar controller divides its approximately-sectorial detecting area set ahead of the vehicle into a plurality of regions along its center angular orientation. The radar controller emits a millimeter-wave transmission signal from the radar so as to scan each region and receives a reflected signal produced by the transmission signal being reflected by an object external to the vehicle. The controller generates a beat signal by mixing the reflected signal and the transmission signal and outputs the beat signal to the processing unit 13.

Detection assurance ranges of the cameras and the millimeter-wave radar are detection areas in which a predetermined detecting accuracy is secured, and are set so as to partly overlap each other.

For example, a detection assurance range α1 having a predetermined angular range $\theta_\alpha$ (e.g., 90° (45° each to the left and right from the center in the width direction of the vehicle)) and a predetermined distance $L_\alpha$ (e.g., 50 m from the cameras provided upperside in the vehicle cabin near the windshield at a predetermined interval in the width direction) is set to the cameras.

A detection assurance range β1 having a predetermined angular range $\theta_\beta$ (e.g., 30° (15° each to the left and right from the center in the width direction of the vehicle)) and a predetermined distance $L_\beta$ (e.g., 120 m from the millimeter-wave radar provided at the nose of the vehicle body) is set to the radar. As described, $\theta_\alpha$ is greater than $\theta_\beta$ and $L_\alpha$ is shorter than $L_\beta$ in this embodiment.

A region in which the assurance ranges α1 and β1 overlap each other is set as an overlapping region γ1.

The vehicle state sensor 16 has a constitution provided with a velocity sensor that detects the velocity of the vehicle (vehicle velocity); a yaw rate sensor that detects a yaw angle (angle of rotation of the vehicle's center of gravity about the vertical axis) and a yaw rate (angular velocity of the vehicle's center of gravity about the vertical axis); a steering angle sensor that detects a steering angle (magnitude in the direction of steering angle input by the driver) and the actual steering angle corresponding to the steering angle; a position sensor that detects the present position and travel direction of the vehicle based on a positioning signal such as a global positioning system (GPS) signal that measures the position of a vehicle using a satellite and a position signal transmitted from an information transmitter on the exterior of the vehicle, and moreover the detection result of an appropriate gyro sensor and acceleration sensor; and sensors for detecting the ON/OFF state of the direction indicators and brakes, as vehicle information of the vehicle.

The constitution of the processing unit 13 shall be described hereinbelow. An object position detection device 21 detects an object, such as another vehicle, present in the detecting areas of the cameras or the radar in the traveling direction of the vehicle based on the image data or beat signal input from the external sensor 15, and calculates the position of the object. For example, the detection device 21 performs a predetermined recognition processing on the image data input from the image processing device of the external sensor 15 and measures the distance to the object by triangulation or the like based on the distance between the cameras provided in the vehicle cabin and the parallax of the object in the pair of image data obtained by the cameras.

The detection device 21 detects the position of the object by selecting the image data obtained by the cameras or the beat signal of the millimeter-wave radar in accordance with the detecting area where the object is detected. For example, when the object is detected in an area other than the overlapping region γ1, that is, only the radar or the cameras detect the objects, the detection device 21 detects based on the corresponding detection result.

When the object is detected in the overlapping region γ1, the detection device 21 selects a detection result of higher reliability based on the reliabilities of position parameters (such as distance and angular orientation) calculated based on each detection result. For example, the distance between the vehicle and the object, and the temporal change of the location of the object are calculated based on the beat signal of the millimeter-wave radar and the angular orientation of the position of the object, and its width dimension is calculated based on the image data of the cameras.

The detection device 21 also determines whether or not the object detected by the cameras and the object detected by the radar are the same when the object is detected in the overlapping region δ1. For example, the detection device 21 determines that the aforementioned two objects are the same if the distance between the position of the object determined by performing a predetermined processing on the image data obtained by the cameras and the position of the object detected based on the beat signal is not greater than a predetermined length in the longitudinal direction of the vehicle (e.g., 1 m or 3 m) and not greater than a predetermined length in the width direction of the vehicle (e.g., 2 m in oncoming vehicles and 5 m in crossing vehicles or 3 m in all vehicles).

An object velocity measuring device 22 measures the velocity of the object (the relative velocity of the vehicle or the absolute velocity) based on the temporal change of the location of the object detected by the object position detection device 21. Even when the detection device 21 determines that the object detected by the cameras and the object detected by the radar in the region γ1 are the same, the measuring device 22 determines that the aforementioned two objects are not the same if the difference between the velocity of the object calculated based on the image data and the velocity of the object calculated based on the beat signal is not less than a predetermined value (e.g., 3 km/h) or if the moving orientation of each detection result varies by more than a predetermined extent.

An object travel path estimating device 23 estimates the travel path of the object (e.g., an estimated travel path QR of the object Q shown in FIG. 2) based on the change of the object position detected by the detection device 21 and the velocity of the object measured by the measuring device 22.

A vehicle travel path estimating device 24 estimates the travel path of the vehicle (e.g., an estimated travel path PR of the vehicle P shown in FIG. 2) based on the temporal change of the vehicle position detected by the vehicle state sensor 16, the running state of the vehicle, such as the velocity of the vehicle detected by the vehicle velocity sensor, and the yaw rate of the vehicle as detected by the yaw rate sensor.

A collision determination device 25 determines whether or not there is a possibility of the vehicle and the object coming into contact or colliding based on the velocity of the object input from the measuring device 22, the travel path of the object input from the estimating device 23, the travel path of the vehicle input from the estimating device 24, and the position and the velocity of the vehicle measured by the vehicle state sensor 16.

Figure 2:
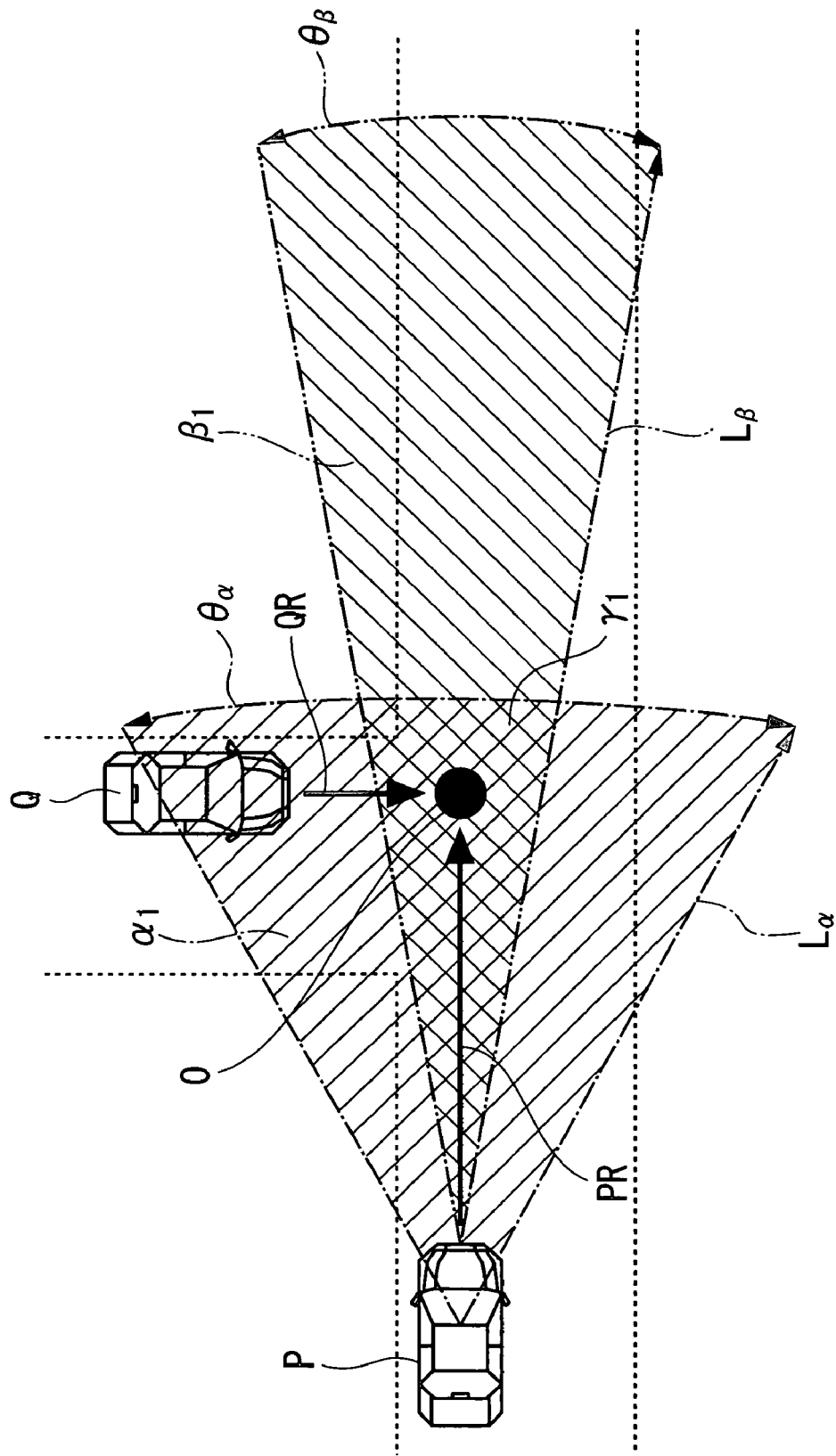
FIG. 2 is a diagram showing examples of a detection assurance range of a pair of cameras and a millimeter-wave radar, an estimated path of the vehicle when maintaining a present traveling condition, and an estimated path of the other vehicle when maintaining the present traveling condition.

As shown in FIG. 2, the collision determination device 25 estimates an arrival time TR (time to a collision) required for the vehicle P to arrive at a predicted collision region O, which is the region where the estimated travel path PR of the vehicle P and the estimated travel path QR of the object Q intersect.

Figure 3:
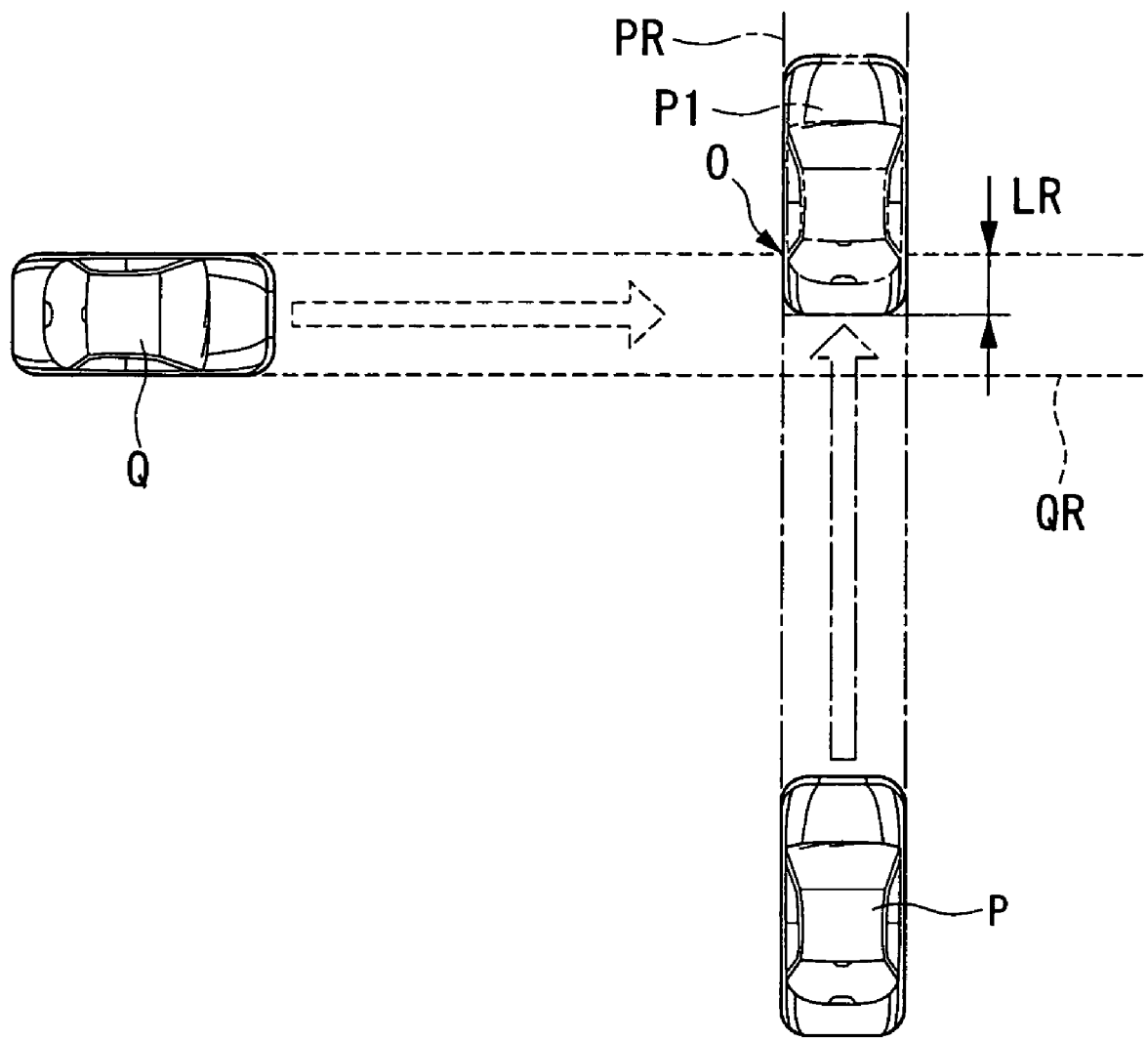
FIG. 3 is a diagram showing an overlap amount.

Then the determination device 25 calculates an overlap amount LR, which is shown in FIG. 3, between the estimated travel path QR and the vehicle P in the direction along the width direction of the path QR when the vehicle P has traveled for the arrival time TR (indicated by a reference numeral P1 in FIG. 3) in the state of having maintained its present driving state (for example, its current velocity and the like). If there is no overlap between the path QR and the vehicle P1, the overlap amount LR becomes zero or a negative value.

When the overlap amount LR is greater than zero, the determination device 25 determines there to be a possibility of the vehicle P and the object coming into contact.

A traveling controller 26 is adapted to set at least one of timing and content of traveling control (e.g., degree of deceleration) for controlling the travel state of the vehicle so as to avoid a collision between the object and the vehicle or to reduce the damage due to a collision, in accordance with the object detecting conditions in detecting areas of the cameras and the radar of the external sensor 15 in addition to the determination result of the collision determination device 25. The traveling controller 26 outputs a control signal to control the drive power of the internal combustion engine 11, a control signal to control shifting of the transmission 12, a control signal to control deceleration by the brake actuator 14, and a control signal to control the steering of the vehicle by the steering mechanism (not illustrated) by the EPS actuator 17 to execute acceleration control, deceleration control, or steering control of the vehicle in accordance with the content set by the controller 26 itself.

An alarm controller 27 is adapted to set at least one of timing and content of an outputting alarm in accordance with the object detecting conditions in detecting areas of the cameras and the radar in addition to the determination result of the collision determination device 25.

The alarm device 18 has a constitution including a tactual alarming device, a visual alarming device, and an audible alarming device.

The tactual alarming device such as a seatbelt or a steering controller notifies an occupant of the vehicle of the possibility of a collision by generating a fastening force that is tactually perceivable by the occupant with generation of a predetermined tension to the seatbelt, or by generating vibration (steering vibration), to a steering wheel for example, that is tactually perceivable by the occupant.

The visual alarming device such as a display notifies the occupant of the possibility of a collision by displaying a predetermined alarm message on the display, or by flashing a predetermined warning light in accordance with a control signal transmitted from the alarm controller 27.

The audible alarming device such as a speaker notifies the occupant of the possibility of a collision by outputting a predetermined alarm sound or alarm voice in accordance with a control signal transmitted from the alarm controller 27.

The vehicle travel safety apparatus 10 of the present embodiment has the aforementioned constitution and the operation thereof shall next be described.

Figure 4:
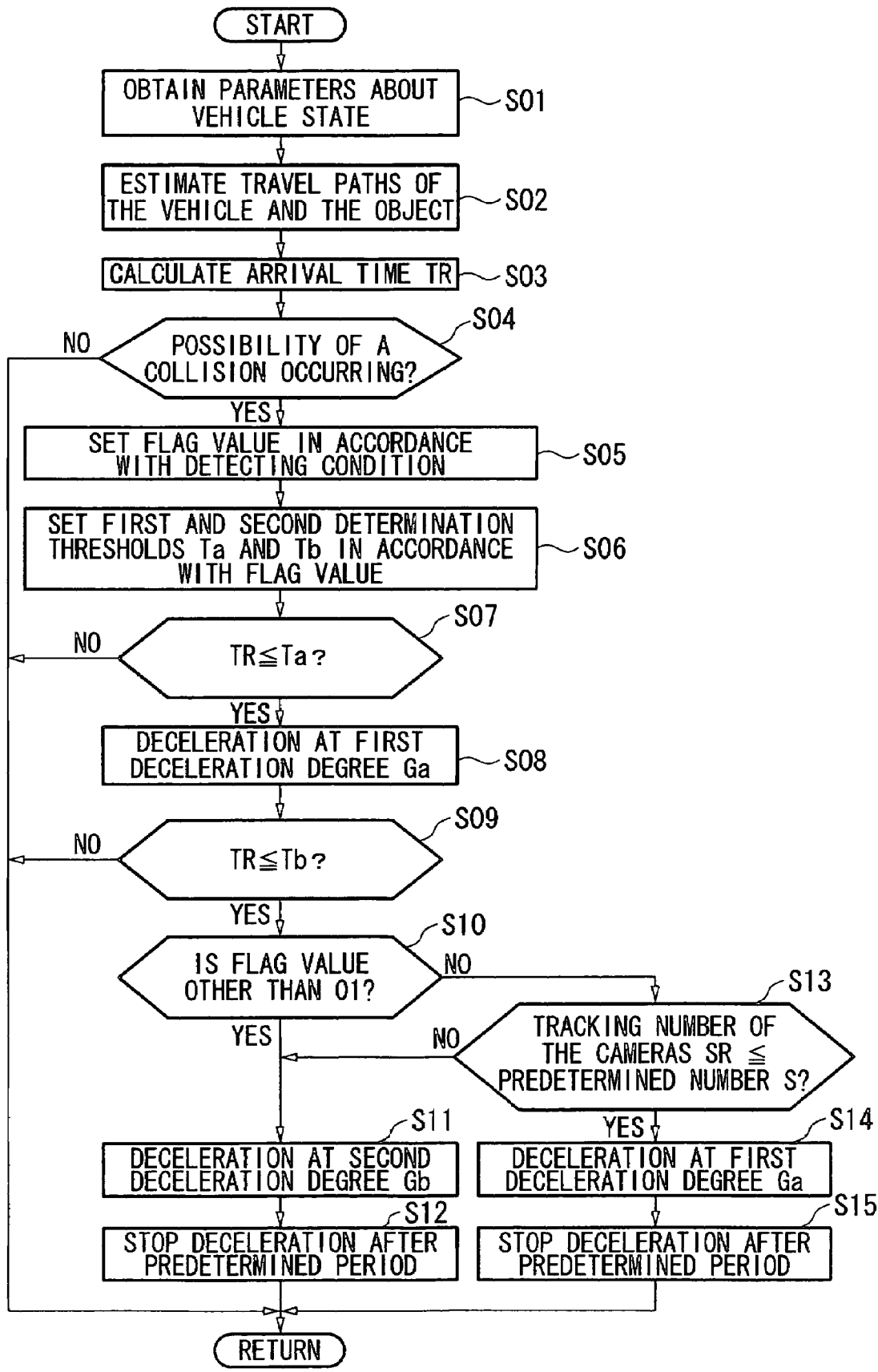
FIG. 4 is a flowchart showing operations of the present embodiment.

In step S01 shown in FIG. 4, the processing unit 13 obtains parameters about the vehicle state such as the position and the traveling state (such as the vehicle velocity and the yaw rate) of the vehicle detected by the vehicle state sensor 16.

In step S02, the vehicle travel path estimating device 24 estimates the travel path of the vehicle based on the vehicle state obtained in step S01. In addition, the object travel path estimating device 23 estimates the travel path of the object based on the change of the object position detected by the object position detection device 21 and the velocity of the object measured by the object velocity measuring device 22.

In step S03, the collision determination device 25 estimates the arrival time TR (time to a collision) required for the vehicle to arrive at the predicted collision region where the estimated travel paths of the vehicle and the object intersect.

In step S04, the determination device 25 calculates the overlap amount between the estimated travel path of the object and the vehicle in the direction along the width direction of the estimated travel path of the object when the vehicle has traveled for the arrival time in the state of having maintained its present drive state and determines whether or not there is a possibility of the vehicle and the object coming into contact by determining whether or not the overlap amount is greater than zero.

If the determination result is "NO", the operation is terminated. If the determination result is "YES", the process proceeds to step S05.

In step S05, the determination device 25 sets a flag value of a determination flag F in accordance with the object detecting conditions in detecting areas of the pair of the cameras and the millimeter-wave radar of the external sensor 15. For example, the flag value is set as "01" when the object is detected only in the detection assurance range α1 of the cameras, the flag value is set as "10" when the object is detected only in the detection assurance range β1 of the radar, and the flag value is set as "11" when the object is detected in the overlapping region γ1 where the assurance ranges α1 and β1 overlap each other.

In step S06, the determination device 25 sets a first operation-timing determination threshold Ta for outputting the alarm and weak deceleration and a second operation-timing determination threshold Tb for strong deceleration based on a predetermined first operation-timing determination reference value T1 and second operation-timing determination reference value T2 (e.g., T1>T2, T1 is 2 seconds, and T2 is 1 second), and a predetermined adjustment time T0 (e.g., 0.3 seconds), in accordance with each flag value of the determination flag F as shown in Table 1 below.

TABLE 1

| flag value F | first operation timing determination threshold Ta | second operation timing determination threshold Tb |
|---|---|---|
| F = 01 | Ta = T1 | Tb = T2 |
| F = 10 | Ta = T1 − T0 | Tb = T2 − T0 |
| F = 11 | Ta = T1 | Tb = T2 |

In the flag value "10" shown in Table 1, indicating that the object is detected only in the assurance range β1 of the millimeter-wave radar, the determination thresholds Ta and Tb are set to be shorter than in other flag values in which the object is detected at least in the assurance range α1 by the length of the adjustment time T0.

That is, the operation timing of alarming and deceleration is delayed by the length of the adjustment time T0 when the object is only detected by the radar because its position detection accuracy is relatively low, especially in its angular orientation. The travel safety apparatus of the present embodiment is therefore adapted to perform alarming and deceleration after the detection accuracy in the angular direction increases by the delay.

In step S07, the traveling controller 26 and the alarm controller 27 determine whether or not the arrival time TR is equal to or smaller than the first determination threshold Ta.

If the determination result is "NO", the operation is terminated. If the determination result is "YES", the process proceeds to step S08. In step S08, the alarm controller 27 performs alarming and the controller 26 performs deceleration at a first deceleration degree Ga (e.g., 0.15 G, 1 G=9.8 m/s²) by the brake actuator 14.

In step S09, the traveling controller 26 and the alarm controller 27 determine whether or not the arrival time TR is equal to or smaller than the second determination threshold Tb.

If the determination result is "NO", the operation is terminated. If the determination result is "YES", the process proceeds to step S10.

In step S10, the controller 26 determines whether or not the flag value of the determination flag F is other than "01".

If the determination result is "NO", which means that the object is only detected by the cameras, the process proceeds to step S13, which will be described later.

If the determination result is "YES", which means that the object is detected at least in the assurance range β1 and the reliability of the result is determined to be relatively high, the process proceeds to step S11.

In step S11, the alarm controller 27 performs alarming and the controller 26 performs deceleration at a second deceleration degree Gb (e.g., 0.6 G) which is greater than the first deceleration degree Ga by the brake actuator 14.

In step S12, the controller 26 stops deceleration after a predetermined period (e.g., 1 second), and terminates the operation.

In step S13, the controller 26 determines whether or not a tracking number SR of the cameras performing detection of the object at predetermined intervals (e.g., 33 milliseconds) is not greater than a predetermined number S (the number at which a desired detection reliability is secured, e.g., 15).

If the determination result is "NO", which means the object is continuously detected with the desired reliability, the process proceeds to aforementioned step S11.

On the other hand, if the determination result is "YES", which means the object is not continuously detected with the desired reliability, the reliability of the detection result is determined to be low and the process proceeds to step S14.

In step S14, the controller 26 performs alarming and deceleration at the first deceleration degree Ga by the brake actuator 14.

In step S15, the controller 26 stops deceleration after the predetermined period (e.g., 1 second), and terminates the operation.

As described, the travel safety apparatus 10 of the present embodiment changes at least one of the operation timing of the alarm device 18, the deceleration degree generated by the brake actuator 14, and the operation timing of the actuator 14 in accordance with the object detection conditions of the pair of the cameras and the millimeter-wave radar, that is, reliabilities in each detection result. The travel safety apparatus 10 therefore can avoid a collision or reduce damage due to a collision at proper timing and conditions.

When only the millimeter-wave radar detects the object, the position detection accuracy is lower than when only the cameras detect the object or when both of the radar and the cameras detect the object, especially in the angular orientation. Then the travel safety apparatus determines the reliability of the collision determination result to be low and delays the operation timing of alarming and deceleration. Since the alarming and deceleration are performed after the position detection accuracy of the radar in the angular orientation increases by the delay, the alarming and deceleration at improper timing can be avoided.

If the object is continuously detected only by the cameras for a predetermined period of time, the safety apparatus determines that the reliability of the collision determination result is higher than before the object is continuously detected. The safety apparatus can perform proper operations for avoiding a collision or reducing the damage due to a collision by decelerating at the relatively greater second deceleration degree Gb.

In the present embodiment, deceleration degrees are set in accordance with whether or not the object is detected only by the cameras as shown in step S10. However, it is not limited thereto and deceleration degrees may be set in accordance with changes of the object detection conditions.

For example, as shown in FIG. 2, the flag value of the determination flag F set to the other vehicle Q crossing ahead of the vehicle P changes from "01" to other than "01", and again changes into "01". In this case, the deceleration degree may be set as the second degree Gb from the first degree Ga when the flag value changes from "01" to other than "01". In addition, the deceleration degree may be maintained as the second degree Gb when the flag value changes from other than "01" to "01" even though the tracking number SR is not greater than the predetermined number S, because the desired detection reliability has been secured just before the change of the flag value. The occupant's sense of discomfort about the traveling of the vehicle thus can be avoided.

Though the pair of the cameras and the millimeter-wave radar are provided in the external sensor 15 in this embodiment, it is not limited thereto. A laser radar may be used instead of the cameras or the millimeter-wave radar.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A travel safety apparatus for a vehicle, comprising:
    a first detector provided in the vehicle for detecting an object in a first detection area defined by a first detection angle;
    a second detector provided in the vehicle for detecting the object in a second detection area defined by a second detection angle which is smaller than the first detection angle;
    a braking device provided in the vehicle for decelerating the vehicle;
    an alarm device which outputs an alarm to an occupant of the vehicle;
    a third detector provided in the vehicle for measuring a traveling state of the vehicle;
    a collision determination device which determines a possibility of a collision between the vehicle and the object detected by at least one of the first detector and the second detector based on the traveling state measured by the third detector; and
    a controller which operates at least one of the braking device and the alarm device when the collision determination device determines that there is the possibility of collision,
    wherein the controller changes at least one of operation timing of the alarm device, operation timing of the braking device, and deceleration degree made by the braking device in accordance with whether or not the first detector and the second detector detect the object,
    wherein the controller operates at least one of the braking device and the alarm device at a predetermined first timing when the first detector detects the object, and
    wherein the controller operates at least one of the braking device and the alarm device at a predetermined second timing which is later than the first timing when only the second detector detects the object.

2. The travel safety apparatus according to claim 1, wherein the traveling state includes at least one of a velocity of the vehicle, a yaw rate of the vehicle, and a steering angle of the vehicle.

3. The travel safety apparatus according to claim 1, wherein
    the first detector is a camera, and wherein
    the controller sets the deceleration degree as a second deceleration degree when the camera has detected the object for a predetermined period of time, and sets the deceleration degree as a first deceleration degree which is smaller than the second deceleration degree when the camera has not detected the object for a predetermined period of time.

4. The travel safety apparatus according to claim 3, wherein
    the controller sets the deceleration degree as the second deceleration degree in a first condition in which both the first detector and the second detector detect the object, and sets the deceleration degree as the first deceleration degree in a second condition in which only the first detector detects the object, and wherein
    the controller sets the deceleration degree as the second deceleration degree when the second condition changes into the first condition, and maintains the second deceleration degree when the first condition changes into the second condition.

5. The travel safety apparatus according to claim 1, wherein
    the controller sets the deceleration degree as a second deceleration degree in a first condition in which both the first detector and the second detector detect the object, and sets the deceleration degree as a first deceleration degree which is smaller than the second deceleration degree in a second condition in which only the first detector detects the object, and wherein
    the controller sets the deceleration degree as the second deceleration degree when the second condition changes into the first condition, and maintains the second deceleration degree when the first condition changes into the second condition.

6. A travel safety apparatus for a vehicle, comprising:
    a first detector provided in the vehicle for detecting an object in a first detection area defined by a first detection angle;
    a second detector provided in the vehicle for detecting the object in a second detection area defined by a second detection angle which is smaller than the first detection angle;
    a braking device provided in the vehicle for decelerating the vehicle;
    an alarm device which outputs an alarm to an occupant of the vehicle;
    a third detector provided in the vehicle for measuring a traveling state of the vehicle;
    a collision determination device which determines a possibility of a collision between the vehicle and the object detected by at least one of the first detector and the second detector based on the traveling state measured by the third detector; and
    a controller which operates at least one of the braking device and the alarm device when the collision determination device determines that there is the possibility of collision,
    wherein the controller changes at least one of operation timing of the alarm device, operation timing of the braking device, and deceleration degree made by the braking device in accordance with whether or not the first detector and the second detector detect the object, wherein
    the first detector is a camera, and
    the controller sets the deceleration degree as a second deceleration degree when the camera has detected the object for a predetermined period of time, and sets the deceleration degree as a first deceleration degree which is smaller than the second deceleration degree when the camera has not detected the object for a predetermined period of time.

7. The travel safety apparatus according to claim 6, wherein
    the controller sets the deceleration degree as the second deceleration degree in a first condition in which both the first detector and the second detector detect the object, and sets the deceleration degree as the first deceleration degree in a second condition in which only the first detector detects the object, and wherein the controller sets the deceleration degree as the second deceleration degree when the second condition changes into the first condition, and maintains the second deceleration degree when the first condition changes into the second condition.

8. A travel safety apparatus for a vehicle, comprising:

a first detector provided in the vehicle for detecting an object in a first detection area defined by a first detection angle;

a second detector provided in the vehicle for detecting the object in a second detection area defined by a second detection angle which is smaller than the first detection angle;

a braking device provided in the vehicle for decelerating the vehicle;

an alarm device which outputs an alarm to an occupant of the vehicle;

a third detector provided in the vehicle for measuring a traveling state of the vehicle;

a collision determination device which determines a possibility of a collision between the vehicle and the object detected by at least one of the first detector and the second detector based on the traveling state measured by the third detector; and a controller which operates at least one of the braking device and the alarm device when the collision determination device determines that there is the possibility of collision, wherein the controller changes at least one of operation timing of the alarm device, operation timing of the braking device, and deceleration degree made by the braking device in accordance with whether or not the first detector and the second detector detect the object, wherein the controller sets the deceleration degree as a second deceleration degree in a first condition in which both the first detector and the second detector detect the object, and sets the deceleration degree as a first deceleration degree which is smaller than the second deceleration degree in a second condition in which only the first detector detects the object, and wherein the controller sets the deceleration degree as the second deceleration degree when the second condition changes into the first condition, and maintains the second deceleration degree when the first condition changes into the second condition.

* * * * *